UNITED STATES PATENT OFFICE.

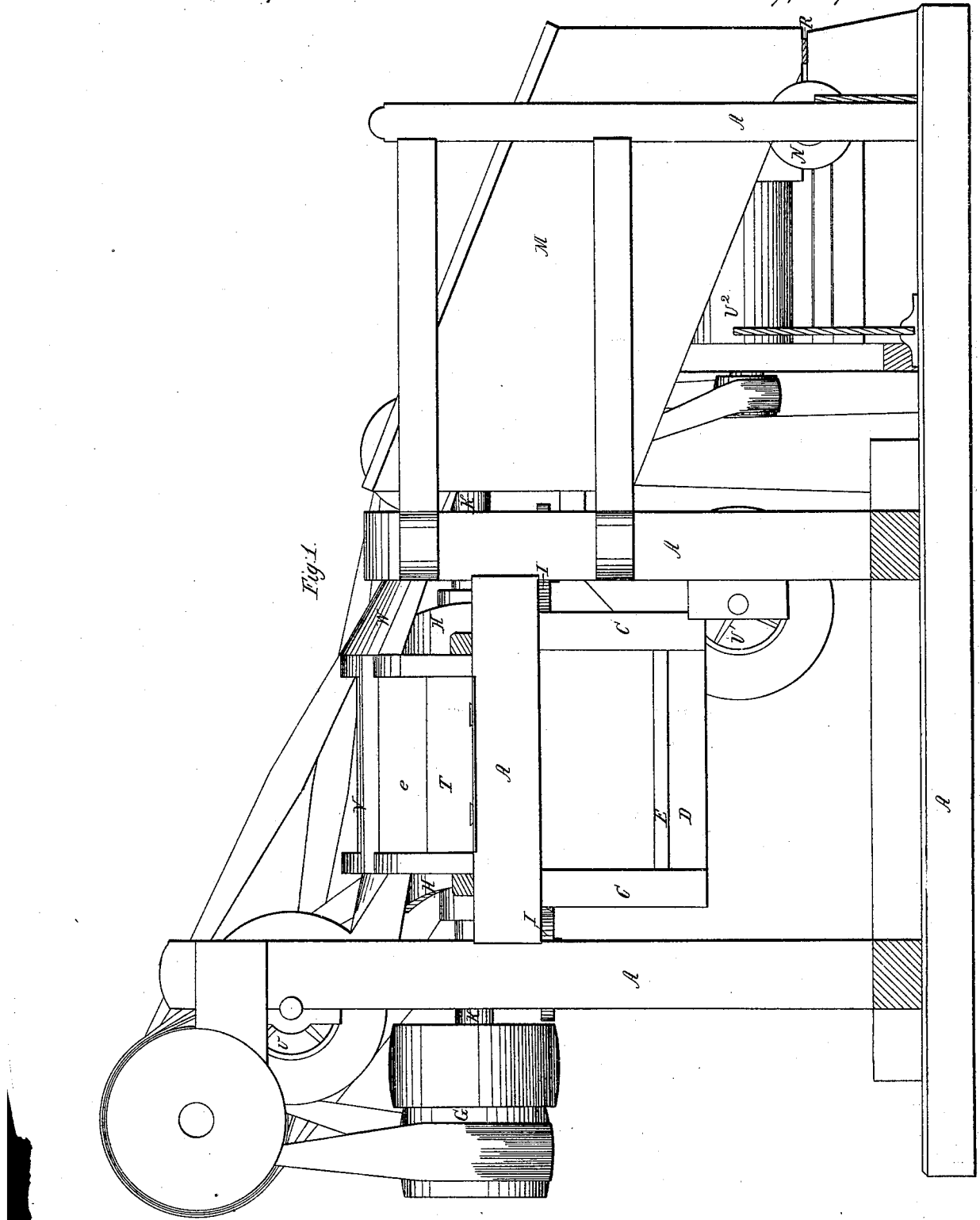

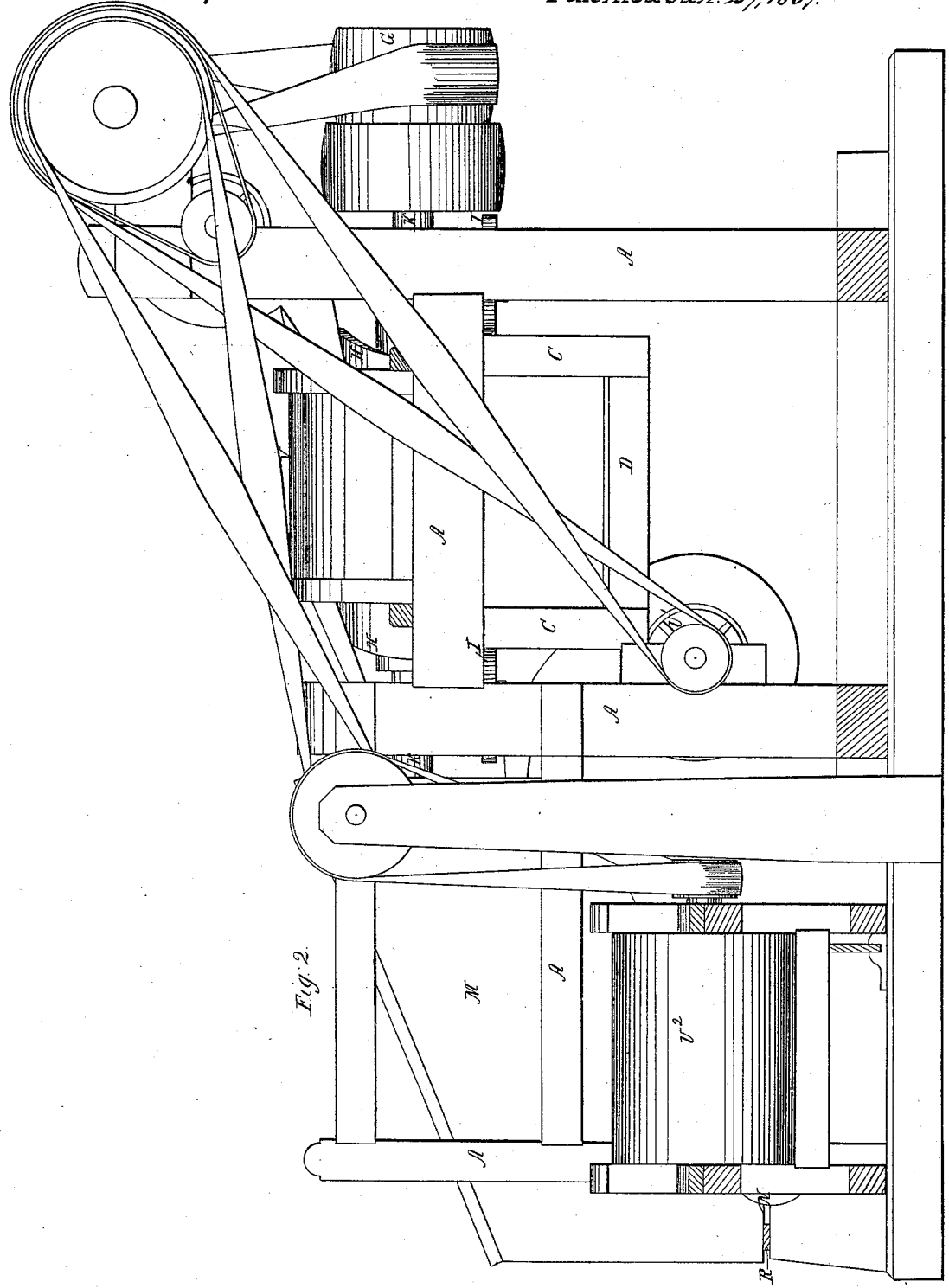

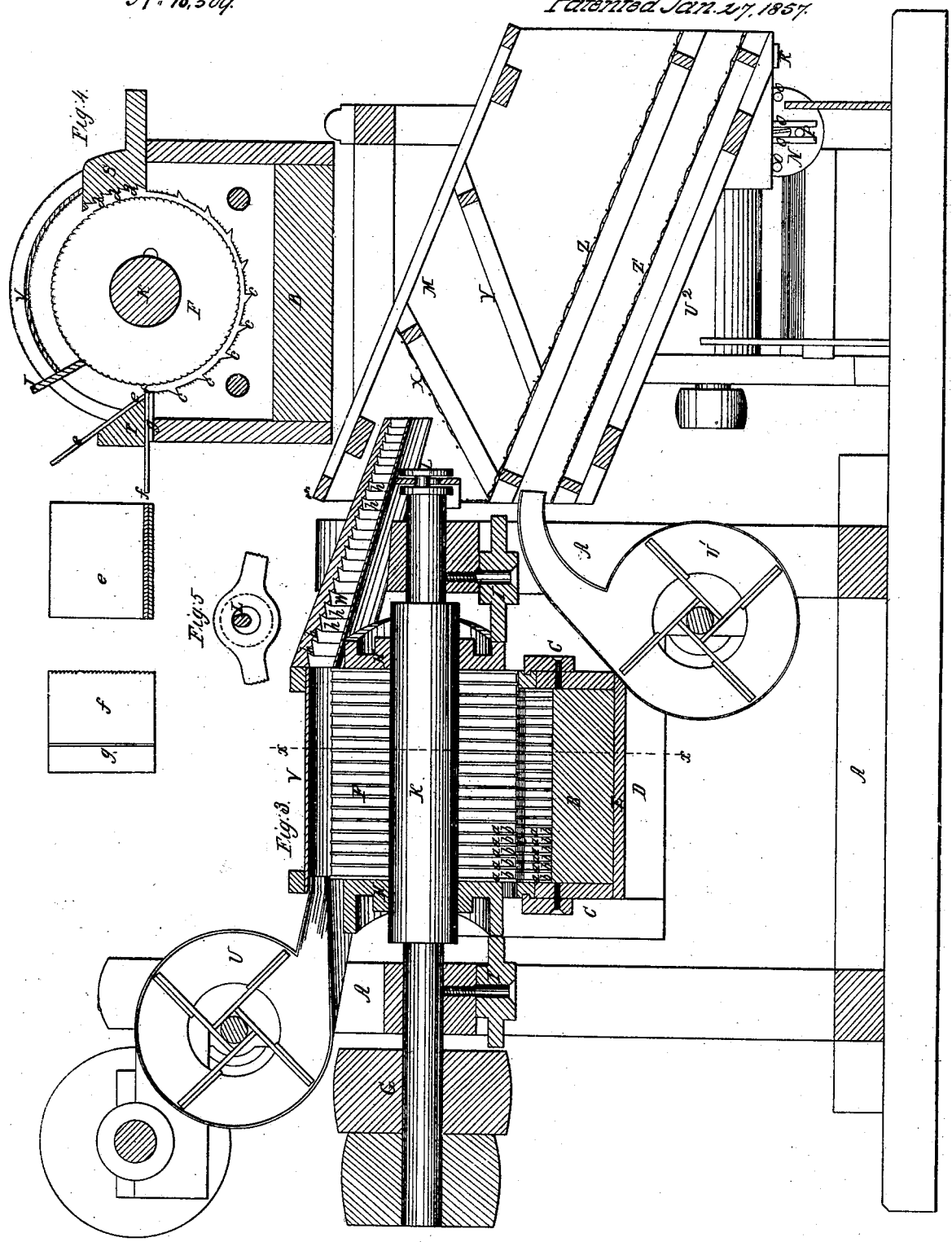

WILLIAM WILBER, OF NEW YORK, N. Y.

IMPROVEMENT IN MACHINES FOR HULLING AND SEPARATING COTTON-SEED.

Specification forming part of Letters Patent No. 16,509, dated January 27, 1857.

*To all whom it may concern:*

Be it known that I, WILLIAM WILBER, formerly of New Orleans, in the State of Louisiana, but now of the city, county, and State of New York, have invented certain new and useful Improvements in Machinery for Hulling and Separating Cotton-Seed; and I do hereby declare the following to be a full, clear, and exact description of the same, reference being had to the accompanying drawings, making a part thereof, in which—

Figure 1 represents an elevation of the machine from one of its sides. Fig. 2 represents a similar elevation from its opposite side. Fig. 3 represents a central longitudinal and vertical section through the machine. Fig. 4 represents a vertical transverse section through the line $xx$ of Fig. 3. Fig. 5 represents a front view of an eccentric, the side view of which is seen in Fig. 3.

Similar letters of reference, where they occur in the several figures, denote like parts of the machine in all.

To enable others skilled in the art to make and use my invention, I will proceed to describe the same with reference to the drawings.

A represents the frame of the machine, within which is placed the bed or concave B, supported by the pieces C C at each of the corners, said pieces being united to the frame at their tops, and joined at their lower ends by tie-pieces D.

Between the tie-pieces D and the bottom of the bed B is a wedge, E, for adjusting said bed to the runner F. The runner F is attached to a shaft, K, and both are driven from the pulley G, to which the power is or may be applied. The runner F, besides its rotary motion with the shaft, has a longitudinal or end motion, which may be made or adapted to the diameter of the runner. This end motion of the runner is effected by the cams H H, formed one on each end of the runner, which work against friction-rollers I I, suitably arranged for that purpose.

On the end of the runner-shaft K, opposite to that to which the driving-pulley G is affixed, is placed an eccentric, L, (better seen in Fig. 5,) which gives motion to the sieve-box M, which is a side, up-and-down, and end motion. The sieve-box M, at its farther and lower end, sits upon two pins, O O, arranged in a face plate or wheel, N, said wheels N (there being two exactly alike, one on each side of the machine) are hung to the frame by a pin or axis, on which they can freely turn or oscillate. A third pin, P, is also placed in said wheels or face-plates N, nearer to its center than the others, O O, which third pin is embraced by two studs, Q Q, attached to the sieve-box M, and extending down, one on each side of said pin P, which arrangement causes the sieve-box to move a greater distance vertically than it does longitudinally.

R is a spring, on which the sieve-box falls, and which may be set to give a greater or less recoil, as may be desired. The sieve-box, being attached to the end of the shaft K, from whence it receives its peculiar motion at that one of its ends, also serves as a regulator to said shaft and the runner upon it, and acts like a fly or balance wheel, to give them a uniform steady motion.

The runner F is composed of circular steel disks or rings $a$, keyed onto the shaft K, and having circular plates or washers $b$, of wrought or cast metal, between them; or, instead of iron, softer metal or material may be interposed between the steel rings or plates $a$, and said steel plates should constitute less of the surface of the runner than the softer metal between them.

The runner F may be made of the steel rings alone, or with very thin washers between them; but it will be found, except, perhaps, in few cases, that such a cylinder would cut or crush the kernel too much, producing a flouring instead of a hulling operation. The same may be said of the bed B, which is also composed of steel plates, with softer metal interposed between them.

Chilled cast-iron may be used instead of the steel rings; but I prefer the steel rings, and they will be found most economical.

The dress of both the runner and bed may be made by a cold-chisel and hammer, which turn up a burr on the steel plates, and this may be readily done whenever they wear smooth, the soft metal between them always wearing enough faster to allow the steel surface to protrude; and the two surfaces of the runner and bed may be alike with the exception of the deep furrows $c\,c\,c$, Fig. 4, in the bed, which are intended to catch and retard or hold the seeds momentarily, to allow them to be turned over, and thus present their entire surfaces to the hulling process, so that if the entire hull is not removed from the kernel it will at least be so loosened as to be entirely removed by the succeeding operation, viz:

S is a chilled cast-iron plate with grooves $d$ running longitudinally on that part of it which faces the runner. This plate S is placed above the bed B and above the center of the runner F, and so provided with slots and set-screws as to be moved to or from the runner for the purpose of finer or coarser work. The object of the grooves $d$ in the plate S is to catch the seeds as they are thrown or carried up by the runner, and the rotary and longitudinal motion of the runner against them in their momentarily checked position with the grooves to hold them tears or "worms" the kernel from the hulls. The plate S is located at the discharge side of the machine—that is, between the bed and where the blast strikes the material to commence the separating operation.

T is a breastplate at the feeding-in side of the machine, on the inclined side of which is arranged a steel plate, $e$, the lower edge of which is furnished with a dress, as seen in a separate figure; and underneath the breast-piece T is another steel plate, $f$, having also a dress on its edge, as shown at $f$ in the separate figure; and $g$ is a sole or stock underneath the plate $f$, for support or adjustment. These plates may be dressed in the same manner as those of the runner and bed, or burred or tooled in any other suitable manner, and should be provided with slots and set-screws, to adjust them to the runner. The seeds are fed in on the plate $e$, and the hulling operation commences at its dress, and is continued all around the cylinder or runner until they pass the plate S, where the blast strikes them to begin the separating. The top of the runner is covered by a cap, V, and this cap directs the blast that passes over the top of the runner, a slide, J, confining it at one side, while the constant ingress of feed of the material at the other or opposite side directs it there.

U is a fan-blower placed back of and above the runner F, by which a strong blast is generated and driven in between the runner and the cap V, which blast carries the hulls and kernels, as they rise over the runner, into and through the spout W, which is furnished with teeth or grooves $h$, against which they are driven to check the heavier parts and allow the lighter portions to pass on against the screen X, the grooves $h$ also aiding in the separation of the hulls and kernels. The screen X retains the larger hulls, while the finer ones, together with the seeds or kernels, pass through X and against a finer screen, Y, where a second separation takes place. That portion which passes through Y falls upon the screen Z, where it is subjected to a second blast from a fan-blower, U', the blast from which comes in below the screw Z and passes up through said screen, thus, in addition to the motion of the sieve-box, raising up the light material, while the heavier portion, which is the kernel, drops through onto another sieve, Z', and passing along said sieve Z', a fourth separation takes place, the hulls passing off at the end of said sieve, and the kernels dropping through into any proper receptacle; and a final separation takes place by means of a cross-blast from a fan-blower, $U^2$, which makes a cross-blast that completes the operation.

A cloth may be placed over the sieve-box to prevent the blast from driving the particles out of the machine.

Having thus fully described the nature of my invention, what I claim therein as new, and desire to secure by Letters Patent, is—

1. In combination with the runner and concave, a blast across the top of said runner to carry the material to the spout or trunk as soon as it rises to the top of the runner, as set forth.

2. In combination with the runner and concave, the trunk W, with its teeth or grooves for facilitating the separation of the hulls and kernels, as set forth.

3. Hanging the sieve-box by an eccentric to the end of the shaft of the runner, and by the plate N and pins O O P to the frame, to give said sieve-box its compound vertical, horizontal, and end movement, as set forth.

4. The plates $e f$, with their dress arranged at the feeding-in point of the machine, and forming a portion of the breast of the machine, as set forth.

WILLIAM WILBER.

Witnesses:
A. B. STOUGHTON,
THOS. H. UPPERMAN.